United States Patent [19]

Leung et al.

[11] 4,375,668
[45] Mar. 1, 1983

[54] TIMING OPTIMIZATION CONTROL

[75] Inventors: Chun-Keung Leung, Farmington; John J. Schira, Westland; Edwin A. Johnson, Clarkston, all of Mich.

[73] Assignee: The Bendix Corporation, Southfield, Mich.

[21] Appl. No.: 187,392

[22] Filed: Sep. 15, 1980

Related U.S. Application Data

[63] Continuation of Ser. No. 904,137, May 8, 1978, abandoned.

[51] Int. Cl.³ .............................. F02B 3/04; F02P 5/08
[52] U.S. Cl. ............................... 364/431.08; 123/416; 123/419; 123/425; 364/431.04
[58] Field of Search ...................... 364/431.02–431.12, 364/424; 123/416, 419, 425, 435, 436, 478, 486; 73/116

[56] References Cited

U.S. PATENT DOCUMENTS

| | | | |
|---|---|---|---|
| 3,986,006 | 10/1976 | Kawai et al. | 364/431.05 |
| 4,009,699 | 3/1977 | Hetzler et al. | 123/416 |
| 4,015,566 | 4/1977 | Wahl | 123/415 |
| 4,033,305 | 7/1977 | Maioglio et al. | 123/416 |
| 4,036,190 | 7/1977 | Bigliani et al. | 123/416 |
| 4,054,111 | 10/1977 | Sand | 123/425 |
| 4,055,995 | 11/1977 | Armstrong et al. | 73/116 |
| 4,058,709 | 11/1977 | Long | 364/424 |
| 4,064,747 | 12/1977 | Rackliffe et al. | 73/116 |
| 4,064,846 | 12/1977 | Latsch et al. | 123/483 |
| 4,073,270 | 2/1978 | Endo | 364/431.05 |
| 4,104,990 | 8/1978 | Frobenius | 123/436 |
| 4,112,879 | 9/1978 | Assenheimer et al. | 123/478 |
| 4,127,092 | 11/1978 | Fresow et al. | 123/416 |
| 4,130,863 | 12/1978 | Schweitzer et al. | 123/416 |
| 4,140,083 | 2/1979 | Frobenius | 364/431.08 |
| 4,161,162 | 7/1979 | Latsch | 123/435 |
| 4,172,433 | 10/1979 | Bianchi | 123/486 |
| 4,188,920 | 2/1980 | Bianchi et al. | 123/436 |

FOREIGN PATENT DOCUMENTS 1512213 5/1978 United Kingdom .
1520427 8/1978 United Kingdom .

OTHER PUBLICATIONS

Randall et al.: Closed Loop Control of Internal Combustion Engine Efficiency and Exhaust Emissions. Stanford University Report Dot-05-30 111, May 1976, pp. 29–34.

*Primary Examiner*—Felix D. Gruber
*Attorney, Agent, or Firm*—Russel C. Wells; James R. Ignatowski

[57] ABSTRACT

A closed loop timing optimization control for an internal combustion engine closed about the instantaneous rotational velocity of the engine's crankshaft is disclosed herein. The optimization control computes from the instantaneous rotational velocity of the engine's crankshaft, a signal indicative of the angle at which the crankshaft has a maximum rotational velocity for the torque impulses imparted to the engine's crankshaft by the burning of an air/fuel mixture in each of the engine's combustion chambers and generates a timing correction signal for each of the engine's combustion chambers. The timing correction signals, applied to the engine timing control, modifies the time at which the ignition signal, injection signals or both are generated such that the rotational velocity of the engine's crankshaft has a maximum value at a predetermined angle for each torque impulse generated optimizing the conversion of the combustion energy to rotational torque.

22 Claims, 9 Drawing Figures

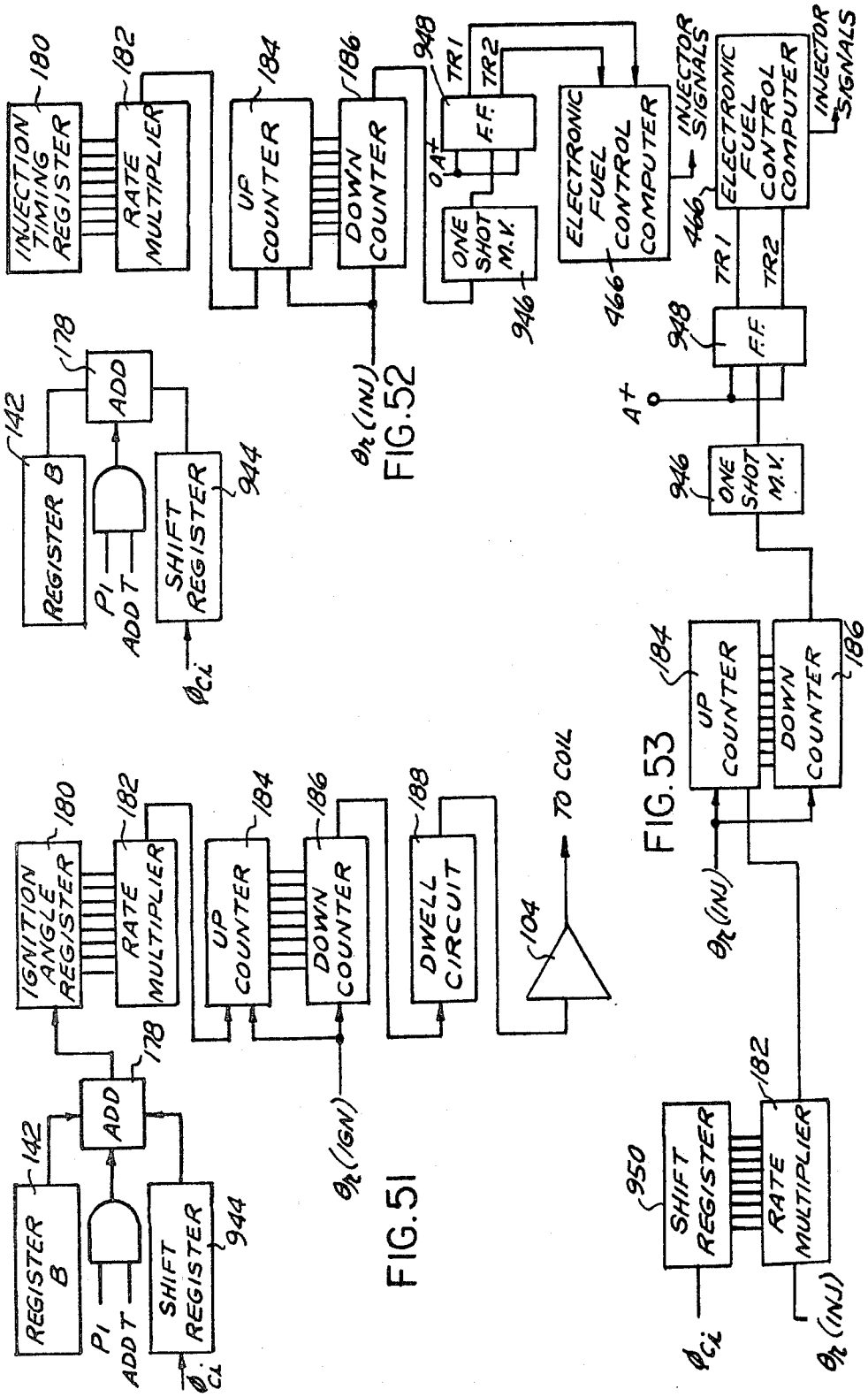

TIMING OPTIMIZATION CONTROL

This is a continuation, of application Ser. No. 904,137, filed May 8, 1978 and now abandoned.

FIELD OF THE INVENTION

The invention is related to timing control for an internal combustion engine, and in particular to a closed loop timing control generating correction signal in response to the instantaneous rotational velocity of the engine's crankshaft, correcting the time at which the ignition signals, injection signals or both are for each individual combustion chamber.

PRIOR ART

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control systems could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission." The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al. in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al. in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhaust gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al. in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr. et al is an alternate approach but requires a relatively complex and expensive torque measuring sensor. The measurement of the onset of engine knock or roughness as taught by Harned et al. and Wahl respectively are believed to be too inaccurate to meet today's standards while the system taught by Schweitzer is believed to be ineffective because factors other than ignition timing such as a change in load could affect the engine speed and result in inproper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al. in U.S. Pat. No. 3,789,816 "Lean Limit Internal Combustion Engine Roughness Control System" issued Feb. 5, 1974 in which engine roughness is detected as the parameter about which the loop is closed. In this system, the air-fuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al. patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al. in U.S. Pat. No. 4,015,572 teaches a similar type of fuel control system in which the loop is closed about engine power. In their preferred embodiment, Leshner et al. use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier," Fuel Injection Development Corporation of Bellmawr, N. J., the assignee of the Leshner et al. patent, states that the parameter measured is the velocity of the engine's flywheel.

In another type of fuel control system using engine roughness as the sensed parameter to close the loop, Bianchi et al. in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al. in U.S. Pat. No. 4,044,234 "Process and Apparatus for Controlling Engine Operation Near the Lean-Running Limit" issued Aug. 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued Aug. 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The Applicants herein teach an integrated engine control system in which the control loops for each controlled parameter are closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF THE INVENTION

The invention is a closed loop timing optimization control for an internal combustion engine closed about the instantaneous rotational velocity of the engine's crankshaft. The timing control computes a signal indicative of the angle at which the engine's crankshaft has a maximum rotational velocity in response to each torque impulse imparted to the crankshaft by the burning of an air/fuel mixture in each of the engine's combustion chambers. The computed signal is compared to a reference signal indicative of a predetermined angle and generates an error signal. Error signals generated for each combustion chamber are individually accumulated to generate a correction signal indicative of the difference between the angle at which the crankshaft had a maximum rotational velocity and a predetermined angle indicative of the timing of the torque impulse for a maximum conversion of the combustion energy to rotational torque. The correction signals are sequentially output to the timing control and modifies the time at which the ignition and/or injection signals are generated to optimize the efficiency of the engine.

The object of the invention is a closed loop timing control closed about the instantaneous rotational velocity of the engine's crankshaft for controlling individually the timing functions for each combustion chamber. Another object of the invention is a closed loop timing control detecting the angle at which the crankshaft has a maximum rotational velocity of each torque impulse imparted to the crankshaft. Still another objective of the invention is a timing control in which the phase angle of each torque impulse is computed, where the phase angle of the torque impulse is indicative of the angle at which the crankshaft has a maximum rotational velocity.

These and other objectives of the invention will become apparent from a reading of the specification in conjunction with the drawings.

BRIEF DESCRIPTION OF THE DRAWINGS

Particular attention is directed to the following Figures and the associated description thereof, wherein:

FIG. 51 is a circuit diagram showing the application of the timing correction signal to an Ignition Timing Control.

FIG. 52 is a circuit diagram showing the application of the timing correction signal to an Injection Timing Control.

FIG. 53 is a circuit diagram showing the application of the timing correction signal to a simplified Injection Timing Control.

CROSS REFERENCE TO AND INCORPORATION OF RELATED CO-PENDING APPLICATIONS

Figure 8:
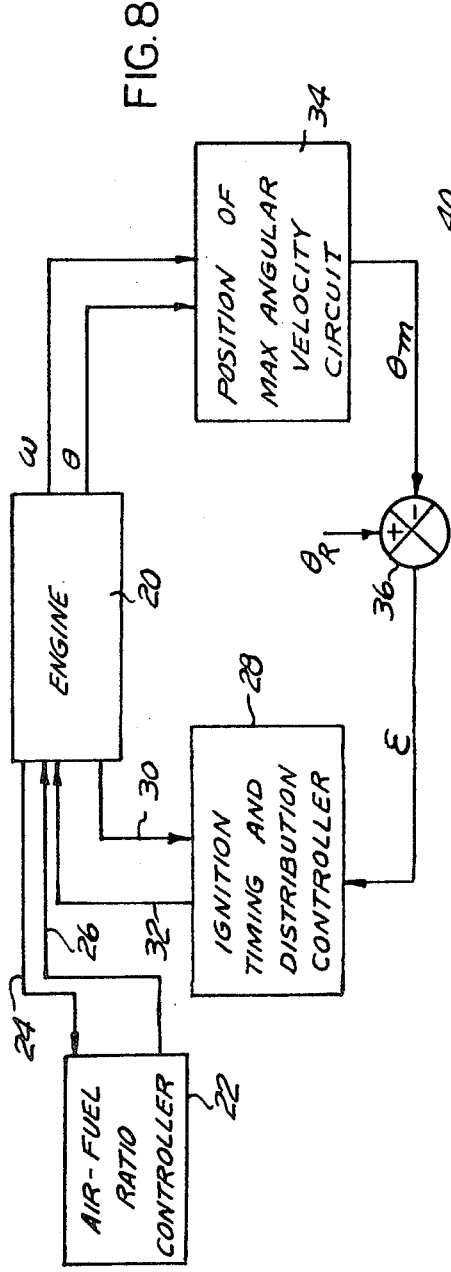
FIG. 8 is a block diagram of the disclosed Closed Loop Timing Control.
Figure 9:
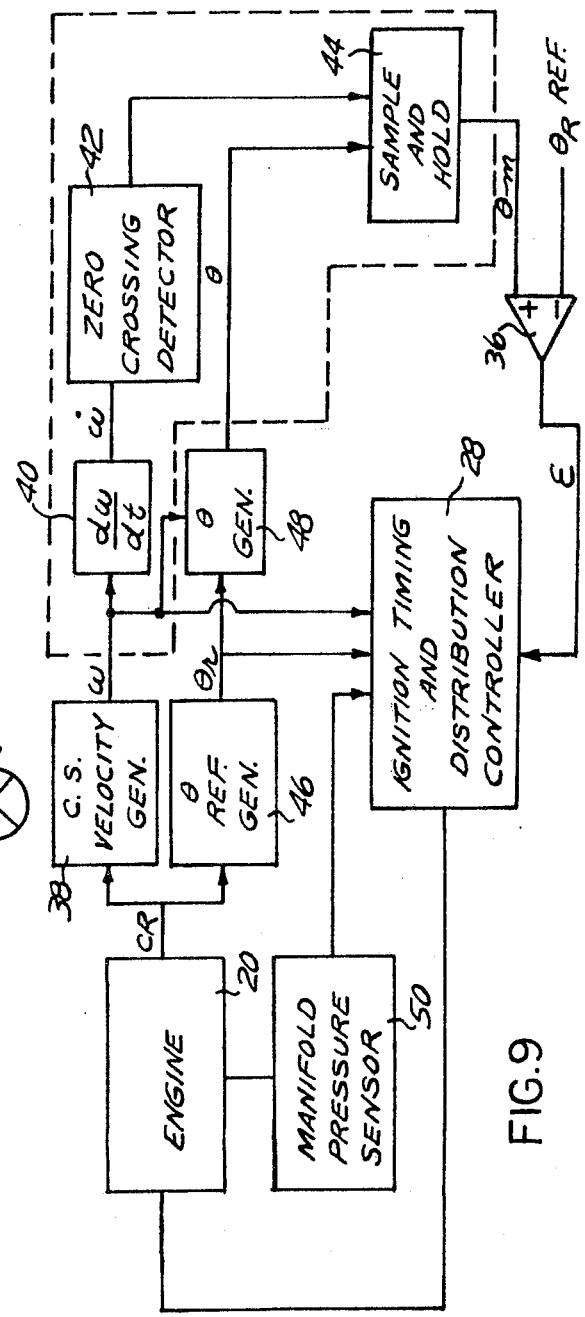
FIG. 9 is a block diagram of an analog embodiment of the Closed Loop Timing Control of FIG. 8.
Figure 11:
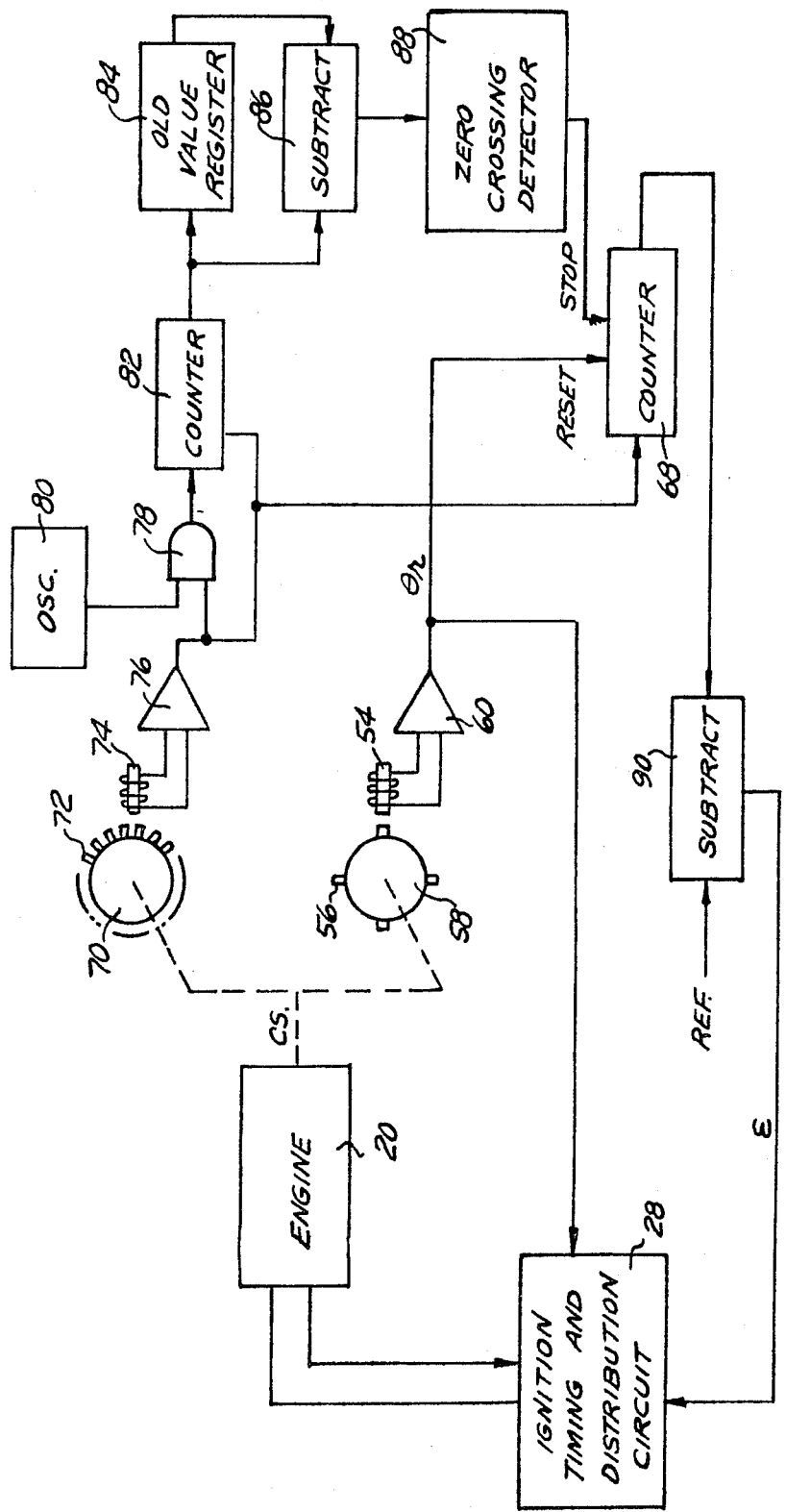
FIG. 11 is a block diagram of an analog embodiment of the Closed Loop Timing Control of FIG. 8.
Figure 13:
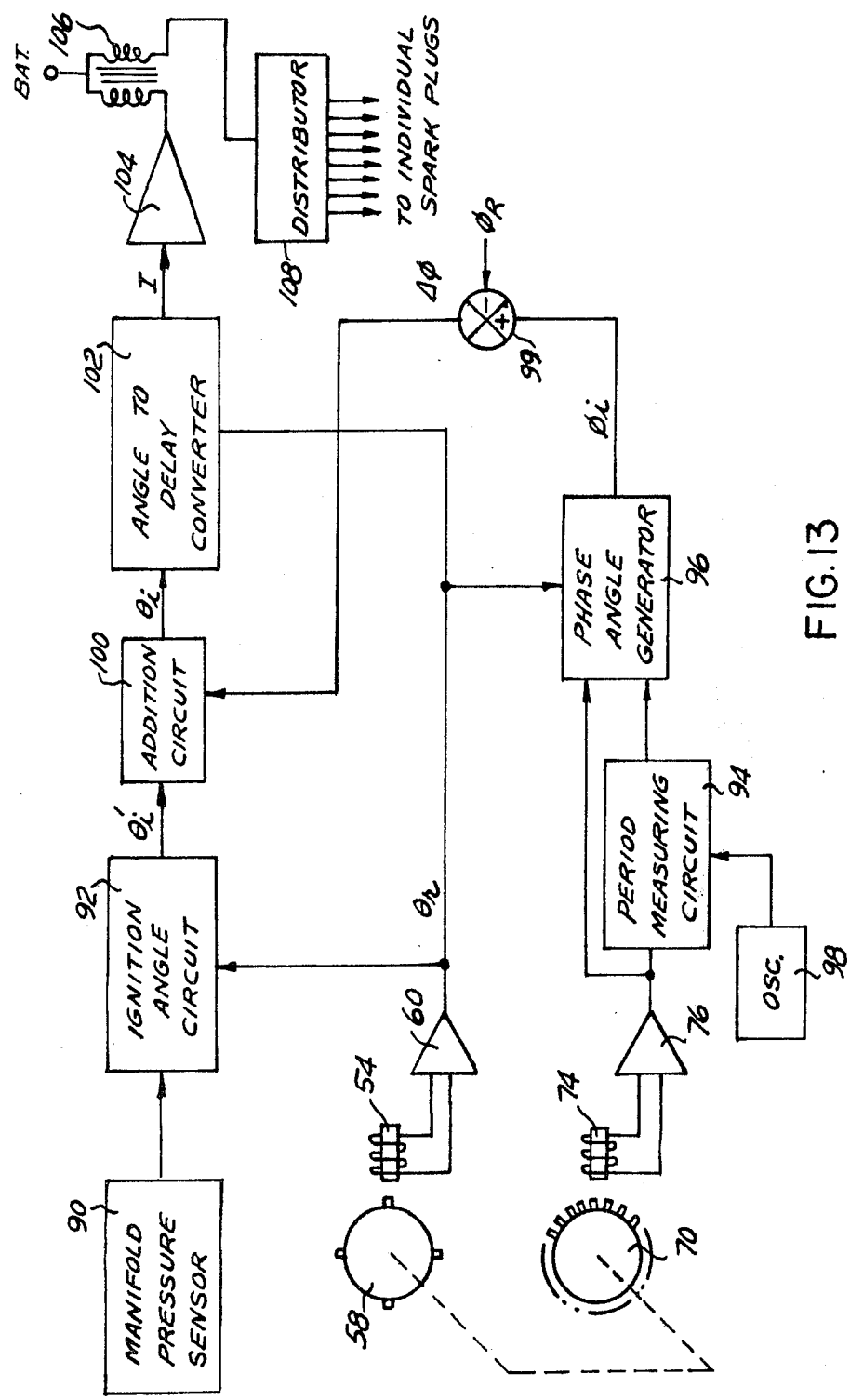
FIG. 13 is a block diagram of the preferred embodiment of the Closed Loop Ignition Control shown on FIG. 8.
Figure 15:
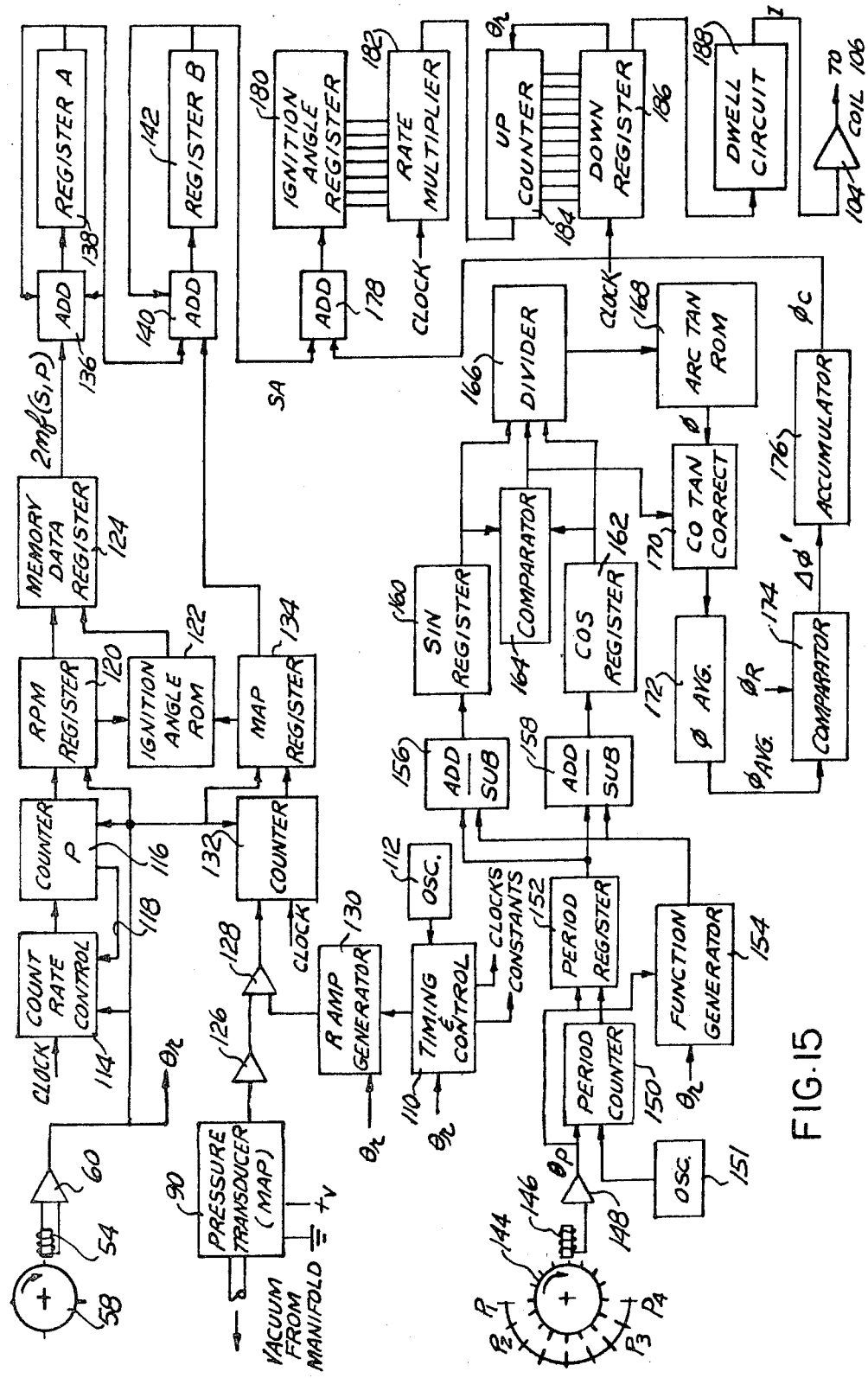
FIG. 15 is a more detailed block diagram of the preferred embodiment of FIG. 13.
Figure 50:
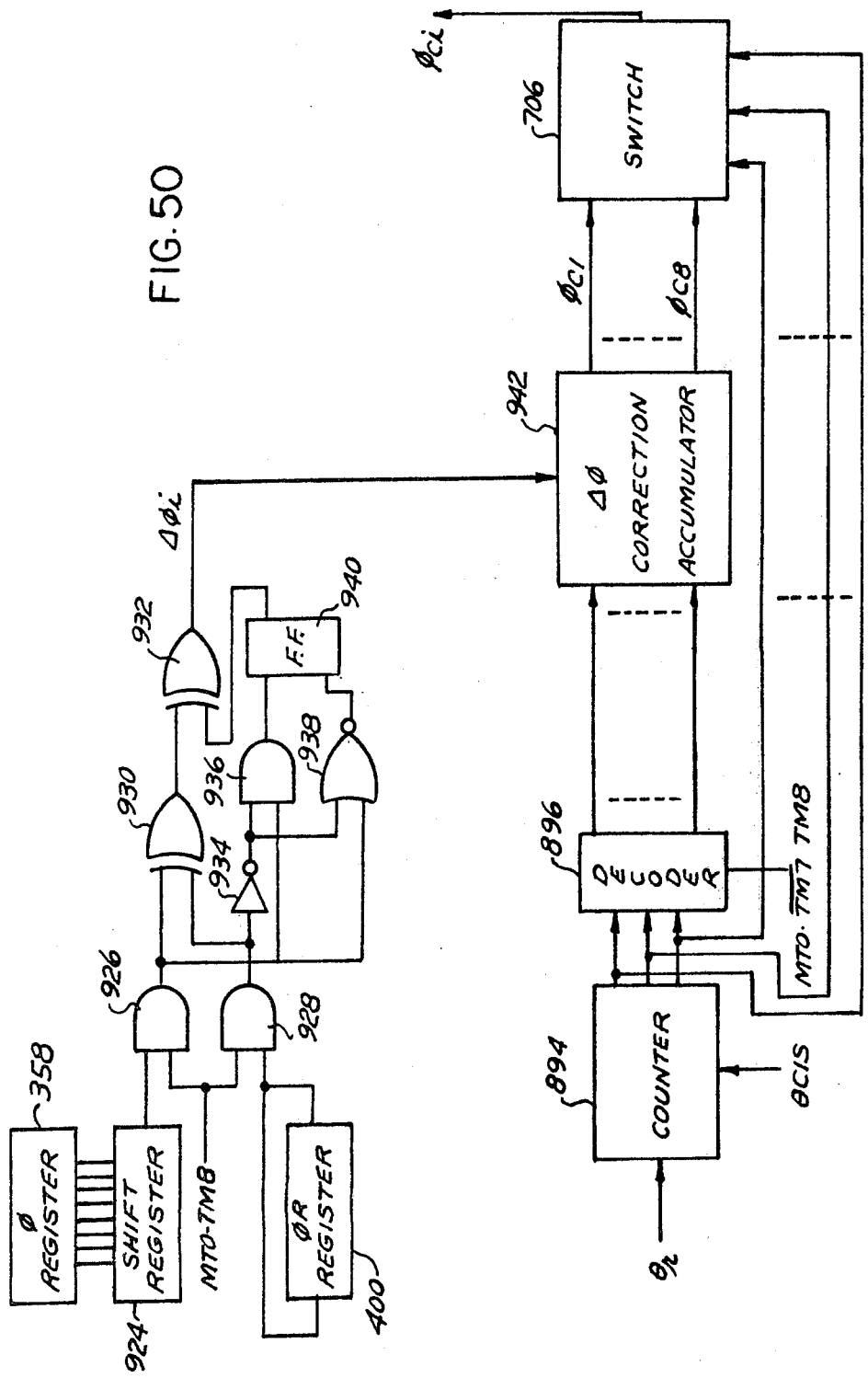
FIG. 50 is a circuit diagram of a Timing Distribution Control.

This application is one of six applications originally filed on May 8, 1978 all commonly assigned and having substantially the same specification and drawings, the six applications being identified below:

| Parent Serial Number | Continuation Serial Number | Filing Date | Title |
|---|---|---|---|
| 904,129 | — | 5/8/78 Issued 4/15/80 as Patent No. 4,197,767 | Warm Up Control for Closed Loop Engine Roughness Fuel Control |
| 904,131 | 187,400 | 9/15/80 | Closed Loop Timing and Fuel Distribution Control |
| 904,132 | 188,803 | 9/19/80 | Digital Roughness Sensor |
| 904,137 | 187,392 | 9/15/80 | Timing Optimization Control |
| 904,138 | 187,393 | 9/15/80 Issued 8/31/82 as Patent No. 4,347,571 | Integrated Closed Loop Engine Control |
| 904,139 | 187,394 | 9/15/80 Issued 8/10/82 as Patent No. 4,344,140 | Closed Loop Engine Roughness Control |

Application Ser. No. 904,129, now U.S. Pat. No. 4,197,767, has been printed in its entirety, including FIGS. 1–56, and the specification of that patent is specifically incorporated herein by reference.

What is claimed is:

1. A closed loop timing optimization control for an internal combustion engine having engine sensors for generating signals indicative of at least one engine operating parameter, an engine control responsive to the signals generated by the sensors for generating fuel delivery signals indicative of the engine's fuel requirement, means for delivering fuel to the engine in response to the fuel delivery signals, a plurality of combustion chambers receiving and burning the fuel therein in a predetermined sequence, and an output shaft receiving sequential rotational torque impulses in response to the burning of the fuel in each of the combustion chambers, the timing optimization control comprising:

first sensor means for generating combustion chamber reference signals at predetermined rotational positions of the shaft, each of said combustion chamber reference signals being associated with one of said combustion chambers and having a predetermined relationship to the sequence in which the fuel is burned in each of the combustion chambers, and wherein at least one of said combustion chamber reference signals identifies at least one particular combustion chamber;

second sensor means for generating velocity signals indicative of a characteristic of the instantaneous rotational velocity of the engine's output shaft;

correction signal generator means for generating a plurality of timing correction signals, one for each combustion chamber, in response to said combustion chamber reference signals and changes in said velocity signals associated with torque impulses generated by combustion in each combustion chamber, each of said correction signals being indicative of a timing correction required to the engine's timing signals to cause the torque impulses generated by each combustion chamber to impart to the engine's output shaft a maximum rotational velocity at a predetermined angle with respect to said combustion chamber reference signals; and means for generating timing signals for the engine control in response to said combustion chamber reference signals and said timing correction signals operative to control at least one timing function of the engine control.

2. The timing optimization control of claim 1 wherein said correction signal generator means comprises:

first means responsive to said combustion chamber reference signals and velocity signals associated with each torque impulse for generating a first signal for each torque impulse having a value indicative of the angle at which the output shaft had a maximum rotational velocity with respect to said combustion chamber reference signal associated with the combustion chamber;

means for generating a second reference signal;

means for subtracting said second reference signal from each first signal to generate a difference signal for each torque impulse indicative of the difference between the value of said first signal and said reference signal;

means having a plurality of storage means, one storage means associated with each combustion chamber, for accumulating in each storage means the sequential difference signals generated for torque impulse produced by the associated combustion chamber to generate said plurality of timing correction signals, one for each combustion chamber; and means for sequentially transmitting said timing correction signals to said means for generating timing signals, one at a time in response to said combustion chamber reference signals, wherein the sequence for outputting the torque correction signals has a fixed time relationship to the sequence in which the timing signals are generated by said means for generating timing signals.

3. The timing optimization control of claim 2 wherein said first means is a phase angle generator generating a phase angle signal indicative of the phase angle of each torque impulse with respect to said combustion chamber reference signal wherein said phase angle signal is an angle indicative of said first signal.

4. The timing optimization control of claim 3 wherein said phase angle generator comprises:

means for generating function signals A sin $\phi$ and A cos $\phi$ having values indicative of the sin and cos Fourier coefficients of each torque impulse in response to said velocity and combustion chamber reference signals where $\phi$ is the phase angle of the torque impulse with respect to said combustion chamber reference signal associated with the combustion chamber generating the torque impulse and A is the amplitude of the function signals; and converter means responsive to said function signals for generating said phase angle signal having a value $$\phi = \text{arctangent } (A \sin \phi / A \cos \phi).$$

5. The timing optimization control of claim 4 wherein said second sennsor means comprises:

means responsive to the rotational position of said output shaft for generating period reference signals dividing each torque impulse into four equal angular increments;

means responsive to said period reference signals for generating four period signals indicative of the time required for the output shaft to rotate through each of said four equal angular increments, the four period signals being identified as $P_1$, $P_2$, $P_3$, and $P_4$ in the sequential order in which they are generated; and wherein said means for generating function signals is means for summing and accumulating said four period signal in accordance with the relationships:

$$A \sin \phi \approx 1/N\ [P_1 + P_2 - P_3 - P_4]$$

and $$A \cos \phi \approx 1/N\ [P_1 - P_2 - P_3 + P_4]$$

where N is the number of period signals.

6. The timing optimization control of claim 4 wherein said converter means comprises:

means for dividing said function signals $A \sin \phi$ and $A \cos \phi$ to generate a quotient signal; and means for generating from said quotient signal said phase angle signal having a value indicative of arctangent ($A \sin \phi / A \cos \phi$).

7. The timing optimization control of claim 6 wherein said means for dividing comprises:

$\phi$ comparator means for generating a numerator signal indicative of said function signal having the smaller value; and divider means responsive to said numerator signal for dividing said smaller function signal by said larger function signal to generate said quotient signal.

8. The timing optimization control of claim 7 wherein said means for generating the phase angle signal from said quotient signal comprises:

a read only memory addressed by said quotient signal to output an arctangent signal having a value indicative of the arctangent of the quotient signal; and arctangent conversion means for converting said arctangent signal to said phase angle signal in response to said numerator signal where phase angle signal has a value indicative of the angle $\phi$ where $\phi$ = arctangent ($A \sin \phi / A \cos \phi$)

when said numerator signal is indicative of $A \sin \phi$ being the smaller of said two function signals, and $\phi = \pi/2 -$ arctangent ($A \cos \phi / A \sin \phi$) when said numerator signal is indicative of $A \cos \phi$ being the smaller of said two function signals.

9. The timing optimization control of claim 8 wherein said means for generating timing signals comprises:

means for generating injection angle signals in response to said combustion chamber reference signals indicative of an output shaft angular rotational position for each combustion at which the fuel is to be delivered;

means for summing said timing correction signals with said injection angle signal to generate a corrected injection angle signal; and means for converting said corrected injection angle signal to an injection time signal for each combustion chamber, each injection time signal being generated after each combustion chamber reference signal at a time proportional to the value of said corrected injection angle signals, wherein said injection time signal controls the time at which the engine control generates fuel delivery signals for each combustion chamber.

10. The timing optimization control of claim 9 wherein said means for generating angle signals is further responsive to at least one other operational parameter of the engine and wherein the value of said injection angle signal is a function of said at least one operational parameter of the engine.

11. The timing optimization control of claim 8 wherein the engine further includes a spark plug in each combustion chamber igniting the fuel in response to ignition signals, said means for generating timing signals comprises:

means for generating ignition angle signals in response to said combustion chamber reference signals and signals from the engine sensors indicative of at least one operational parameter of the engine, said ignition angle signal indicative of an angle measured from said combustion chamber reference signal at which the fuel in each combustion chamber is to be ignited;

means for summing said timing correction signals with said ignition angle signal to generate a corrected ignition angle signal; and means for converting said corrected ignition angle signal to an ignition signal activating said spark plugs to ignite the fuel in each combustion chamber, each ignition signal being generated after a combustion chamber reference signal at a time proportional to the value of said corrected ignition angle signals.

12. A method for optimizing the timing functions of an internal combustion engine having engine sensors generating signals indicative of at least one engine operating parameter, an engine control responsive to the signals generated by the sensors for generating signals, including fuel delivery signals, controlling the operation of the engine, means for delivering fuel to the engine in response to fuel delivery signals, a plurality of combustion chambers receiving and burning the delivered fuel therein in a predetermined sequence, and an output shaft receiving sequential rotational torque impulses in response to the burning of the fuel in each of the combustion chambers, comprising the steps of:

detecting a plurality of rotational positions of the engine's output shaft for each engine cycle to generate combustion chamber reference signals, wherein at least one combustion chamber reference signal is associated with each torque impulse generated by the burning of fuel in each combustion chamber, and at least one of said combustion chamber reference signals identifies one particular cylinder;

detecting the rotation of the engine's output shaft to generate velocity signals indicative of a characteristic of the rotational velocity of the output shaft as a function of the shaft's rotational position;

generating timing correction signals in response to each said combustion chamber reference and velocity signals, each timing correction signal having a value indicative of an angular difference between the angle each torque impulse imparts a maximum rotational velocity to the engine's crankshaft and a predetermined reference angle;

detecting at least one other operational parameter of the engine to generate a parameter signal; and generating optimized timing signals in response to said parameter signal and timing correction signals for the engine control operative to cause each torque impulse generated by each combustion chamber to impart to the output shaft, a maximum rotational velocity at said predetermined reference angle.

13. The method of claim 12 wherein said step of generating optimized timing signals comprises the steps of:
generating from said combustion chamber reference and velocity signals, an angle signal indicative of the angle between each combustion chamber reference signal and the angle at which the rotational velocity of the output shaft has a maximum value for each torque impulse;
subtracting a reference signal having a value indicative of said predetermined angle from said angle signal to generate a difference signal;
sequentially accumulating and storing separately in a plurality of storage means the difference signals associated with each combustion chamber in response to said combustion chamber reference signals to generate a timing correction signal for each combustion chamber; and
sequentially extracting the timing correction signals from the plurality of storage means, one at a time in response to said combustion chamber reference signals for utilization in said engine control.

14. The method of claim 13 wherein said step of generating an angle signal generates from said combustion chamber reference and velocity signals a phase angle signal having a value indicative of the phase angle of each torque impulse with respect to said combustion chamber reference signal associated with the torque impulse wherein said phase angle signal is indicative of said angle signal.

15. The method of claim 14 wherein said step of generating a phase angle signal comprises the steps of:
generating from said combustion chamber reference and velocity signals function signals, $A \sin \phi$ and $A \cos \phi$, having values indicative of the sin and cos Fourier coefficients of each torque impulse where $\phi$ is the phase angle of the torque impulse and A is the amplitude of said function signals;
dividing said function signals, one by the other to generate a quotient signal; and
converting said quotient signal to said phase angle signal having a value $\phi$ where:
$\phi = \text{arctangent } (A \sin \phi / A \cos \phi)$.

16. The method of claim 15 wherein said step of detecting to generate velocity signals comprises the steps of:
detecting the rotation of the output shaft to generate period reference signals indicative of four equal output shaft angular increments for each torque impulse;
generating in response to said period reference a signal indicative of the time required for the output shaft to sequentially rotate through each of said four angular increments to generate four period signals identified as $P_1$, $P_2$, $P_3$ and $P_4$ in the order in which they are generated; and
wherein said step of generating said function signal comprises the step of summing said four period signals to generate said function signals $A \sin \phi$ and $A \cos \phi$ according to the relationships:

$$A \sin \phi \approx 1/N [P_1 + P_2 - P_3 - P_4]$$

and $$A \cos \phi \approx 1/N [P_1 - P_2 - P_3 + P_4]$$

where N is the number of period signals.

17. The method of claim 15 wherein said step of dividing includes the steps of:
comparing said function signals to generate a numerator signal indicative of the smaller function signal;
dividing the smaller function signal by the larger function signal in response to said numerator signal to generate said quotient signal;
and wherein said step of converting includes the steps of:
addressing a read only memory with said quotient signal to generate an arctangent signal having a value indicative of the arctangent of the quotient signal;
converting said arctangent signal to said phase angle signal in response to said numerator signal;
wherein said phase angle is equal to $\phi$ where
$\phi = \text{arctangent } (A \sin \phi / A \cos \phi)$
when said numerator signal is indicative of said function signal $A \sin \phi$ being the smaller of said two function signals; and
$\phi = \pi/2 - \text{arctangent } (A \cos \phi / A \sin \phi)$
when said numerator signal is indicative of said function signal $A \cos \phi$ being the smaller of said two function signals.

18. The method of claim 17 wherein said step of accumulating and storing comprises the steps of:
counting and storing a number indicative of the number of combustion chamber reference signals received after each said at least one combustion chamber reference signal identifying one particular combustion chamber signal;
decoding said stored number to sequentially generate a plurality of gate signals equal in number to the number of combustion chambers; and
enabling said plurality of storage means one at a time in response to said gate signals to accumulate and store individually said time correction signal processed from the torque impulses generated by each combustion chamber.

19. The method of claim 12 or 18 wherein said step of generating optimized timing signals comprises the steps of:
summing said time correction signals to said combustion chamber reference signals to generate an injection angle signal;
converting said injection angle signal in response to said reference signal to a time delay signal having a time duration proportional to the value of said injection angle signal and inversely proportional to engine speed;
sensing the termination of said time delay signal to generate the optimized timing signals for said engine control indicative of the time fuel is to be delivered to each combustion chamber.

20. The method of claim 12 or 18 wherein said step of generating optimized timing signals includes the steps of:
generating from at least one signal generated by the engine sensors and said combustion chamber reference signals an intermediate injection angle signal;

summing said intermediate injection angle signal with said time correction signal to generate an injection angle signal;

converting said injection angle signal in response to said reference signals to generate a delay signal having a duration time proportional to the value of the injection angle signal and inversely proportional to engine speed; and sensing the termination of said time delay signal to generate the optimized timing signal for said engine control indicative of the time fuel is to be delivered to each combustion chamber.

21. The method of claim 12 or 18 wherein the engine further includes at least one spark plug disposed in each combustion chamber for igniting the fuel in response to ignition signals, said step generating optimized timing signals generates said ignition signals.

22. The method of claim 21 wherein said step of generating optimized timing signals comprises the steps of:

generating from at least one signal generated by said engine sensors and the combustion chamber reference signals an intermediate ignition angle signal;

summing said timing correction signal with said intermediate angle signal to generate an ignition angle signal;

converting said ignition angle signal in response to said reference signals to generate a delay signal having a value proportional to the value of said ignition angle signal and inversely proportional to engine speed;

sensing the termination of said delay signal to generate said ignition signal, wherein the time an ignition signal is generated for the spark plugs disposed in each combustion chamber is corrected by the associated timing correction signal.

\* \* \* \* \*